United States Patent [19]

Ficht et al.

[11] Patent Number: 4,966,068
[45] Date of Patent: Oct. 30, 1990

[54] SPLIT CERAMIC PISTON RING ARRANGEMENT WITH NESTED BIASING RING

[75] Inventors: Reinhold Ficht, Kirchseeon; Lutz Hamann, Assling, both of Fed. Rep. of Germany

[73] Assignee: Ficht GmbH, Kirchseeon, Fed. Rep. of Germany

[21] Appl. No.: 330,973

[22] Filed: Mar. 28, 1989

Related U.S. Application Data

[63] Continuation of Ser. No. 139,133, Dec. 24, 1987, abandoned, which is a continuation of Ser. No. 797,636, Nov. 13, 1985, abandoned.

[30] Foreign Application Priority Data

Nov. 26, 1984 [DE] Fed. Rep. of Germany ....... 3443031

[51] Int. Cl.⁵ .............................. F16J 9/06; F16J 9/24; F16J 9/26
[52] U.S. Cl. ......................................... 92/193; 92/200; 92/212; 123/193 P; 277/150; 277/198; 277/217; 277/222; 277/DIG. 6
[58] Field of Search .................. 92/197–200, 92/211, 193, 212, 248, 250; 277/138–140, 148–150, 154–155, 216–217, 198, 222, DIG. 6; 267/1.5; 123/193 P

[56] References Cited

U.S. PATENT DOCUMENTS

| | | | |
|---|---|---|---|
| 639,363 | 12/1899 | Dockum | 277/148 |
| 1,179,333 | 4/1916 | Obertop | 277/148 |
| 1,698,073 | 1/1929 | Solenberger | 92/200 X |
| 1,703,905 | 3/1929 | Solenberger | 92/200 X |
| 1,753,113 | 4/1930 | Floyd | 92/198 |
| 1,920,114 | 7/1933 | Solenberger | 92/200 X |
| 2,021,830 | 11/1935 | Borgfeldt | 277/138 |
| 2,785,027 | 3/1957 | Hamm | 267/1.5 X |
| 4,404,935 | 9/1983 | Kraft | 92/248 X |
| 4,522,415 | 6/1985 | Dworak et al. | 277/216 |

FOREIGN PATENT DOCUMENTS

| | | | |
|---|---|---|---|
| 920758 | 11/1954 | Fed. Rep. of Germany . | |
| 97049 | 6/1982 | Japan | 277/139 |
| 141623 | 8/1930 | Switzerland | 277/154 |

OTHER PUBLICATIONS

Bussien, *Handbook of Automobile Technology*, vol. 1, 18th Edition, May 1965, p. 258.

Primary Examiner—Edward K. Look
Assistant Examiner—George Kapsalas
Attorney, Agent, or Firm—Toren, McGeady & Associates

[57] ABSTRACT

A piston-ring arrangement for use in an internal combustion engine including a cylinder with a piston axially displaceable within the cylinder and at least one piston ring guided in the cylinder. The cylinder, piston and piston-ring are made of a ceramic material. The piston ring is formed of two circumferentially extending parts and is mounted in a groove in the circumferentially surface of the piston. The groove has a depth greater than the corresponding radial depth of the piston ring so that a spring element can be positioned between the base of the groove and the piston ring for biasing the piston ring radially outwardly. The spring element can be annular member with a corrugated shape or a multipart ceramic member shaped to provide a biasing action.

5 Claims, 3 Drawing Sheets

SPLIT CERAMIC PISTON RING ARRANGEMENT WITH NESTED BIASING RING

This is a continuation of Ser. No. 139,133 now abandoned, filed Dec. 24, 1987 which in turn is a continuation of Ser. No. 797,636 filed Nov. 13, 1985 abandoned.

BACKGROUND OF THE INVENTION

The present invention is directed to a piston ring arrangement for an internal combustion engine with one cylinder and a piston including a piston ring guided in the cylinder with the cylinder, the piston and the piston ring each formed of ceramic material.

In conventional internal combustion engines piston rings are employed for the well known task of sealing the combustion space from the crankcase, for aiding the heat transmission from the piston to the cylinder wall and for regulating the oil consumption of the engine. Accordingly, the piston rings bear at their outer periphery tightly against the cylinder wall with one surface or side bearing against a corresponding surface in the piston groove. This radial arrangement is effected by the spring force in the piston ring itself which is assisted by the gas pressure acting behind the piston ring. The axial contact of the piston ring is determined by the gas pressure and the acceleration forces and, therefore, alternates between the upper and lower ring sides.

To effect the various tasks provided by the piston rings, it is usual to employ separate piston rings as so-called compression rings and so-called oil scraper or control rings. These rings differ in cross-section. With the warping of the cylinder in present day lightweight construction engines, there has been a need for particularly flexible oil scraper rings. Such flexible oil scraper rings generally have a small crosssection and thus a low resistance moment and are tensioned by an additional spring located behind them with the spring supported in the bottom of the piston groove, note Bussien, "Handbook of Automotive Technology", Vol. 1, 18th Edition, 1965, page 258.

In engines where the cylinders and pistons are formed of ceramic materials, the tasks of regulating the oil consumption of such engines and of helping the heat dissipation from the piston to the cylinder wall are no longer applicable in view of the operating characteristics of ceramic material, in such engines merely the combustion space must be sealed off to achieve the desired compression ratio. Accordingly, oil scraper rings are no longer needed whereby only so-called compression rings must be used.

Since in such ceramic engines all parts in sliding contact with one another must be formed of the same material, the piston ring must also be made of a ceramic material. Ceramic piston rings, however, have a very low elasticity, because ceramics are considerably more brittle than the metals normally used for piston rings.

Therefore, such pistons must be guided as rectilinearly as possible along the piston stroke so that only so-called slider cranks are suitable such as shown and described in German Patentsschrift 920 758. Moreover, the ceramic piston is formed in two parts for insertion of the piston ring into the piston ring groove, since the elasticity of such a piston ring is insufficient to slide it over the piston skirt. Such a piston is formed of one piston part making up the piston skirt and another piston part forming the piston bottom and these parts must have oppositely facing surfaces which form an intermediate annular groove of rectangular cross-section open to the outside. In addition, the two piston parts must include an aligned concentric ring for the location of a sleeve which engages into a T-shaped abutment penetrated by concentric counterbores for connecting the piston to the piston rod. The number of components increases the production costs and complicates assembly and maintenance. The piston ring itself must be slit for affording a certain degree of elasticity required for the contact with the inside peripheral surface of the cylinder. It has been found appropriate to design the slit as a groove with a pin guided into it at right angles to prevent twisting of the piston ring in two-stroke engines.

Due to such a design, the piston ring is relatively expensive to fabricate and is very susceptible to fracture during assembly because of its brittle character.

SUMMARY OF THE INVENTION

Therefore, the primary object of the present invention is to provide a new arrangement of the piston ring to overcome the problems experienced in the past so that the piston ring can be placed in coacting relation with the piston of a ceramic engine without designing the piston in a number of parts.

In accordance with the present invention, the piston ring is formed of two parts and the groove into which it is placed is shaped so that it has a depth greater than the depth or radial dimension of the piston ring whereby between the radially inner surface of the piston ring and the base of the groove a ring-shaped spring element can be positioned which acts on or biases the piston ring parts radially outwardly.

In a first embodiment of the present invention, the spring element is a circular ring-shaped spring with a corrugated appearance.

In another embodiment of the invention, the spring element is a second divided or multi-part piston ring constructed of ceramic material and with a smaller diameter than the radially outer piston ring with the separation faces of the two piston rings being offset by 90° relative to one another.

In the second embodiment of the invention, the first piston ring is provided with an initial tension of approximately 2/100 mm on the outside diameter regarding the nominal dimension and the second piston is provided with an initial tensioning of 4/100 mm on the outside diameter relative to the nominal inside diameter of the first piston ring.

Preferably, the separation faces or surfaces of the piston ring parts form obliquely extending separation gaps. It has been found to be particularly advantageous if, according to another feature of the invention, the radial dimension of the piston ring amounts to 0.02 to 0.04 times the diameter and the axial dimension relative to the axial direction of the piston is 0.02 to 0.04 times the diameter of the piston ring and the separation gap or space between the piston ring parts is approximately 0.01 times the diameter of the piston ring.

With the formation of the piston ring of the present invention as a two-part piston ring with preferably obliquely extending separation joints the piston ring parts can be introduced from opposite sides into the piston ring groove in the piston skirt designed in the usual manner as a single member. The circularly-shaped spring element associated with the inner surface of the piston ring presses the individual piston ring parts radially outwardly, whereby the piston ring, as soon as the piston is inserted in the proper position in the associated cylinder, is retained in contact with the surface within the cylinder. The division of the piston ring has no disadvantages, since, as it is known, piston rings are not subjected to circular compression during the operation of an internal combustion engine. Rather the forces acting upon the piston ring are nonuniformly distributed at the periphery. Therefore, the divided piston ring has the further advantage, under the influence of such forces, that it can better contact the cylinder surface than an undivided piston ring.

Another advantage is that a two-part piston ring is less susceptible to fracture than a slit one-piece piston ring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
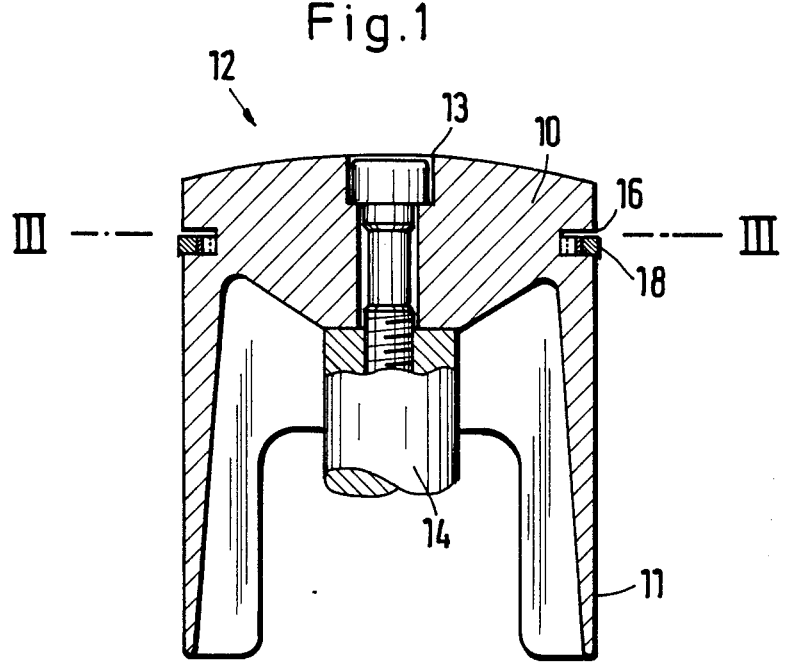
FIG. 1 is an axially extending cross-sectional view through a piston in a ceramic engine with a piston ring arrangement embodying the present invention.

In FIG. 1 a piston 12 is shown including a piston head 10 and a piston skirt 11 extending axially from the piston head. The piston is used in a so-called ceramic engine where the piston and the cylinder, not shown, are formed of ceramic material. The piston head 10 has a central opening 13 for receiving and securing a piston rod 14 shown only partially in FIG. 1. The piston rod 14 is part of a crank slide, not shown, for converting rectilinear movement into rotational movement.

In the upper region of the piston skirt 11 an annular groove 16, rectangular in cross-section, extends circumferentially around the piston. The piston groove 16 is shown in detail in FIG. 2. The radial dimension or depth T of the groove 16 is greater than the comparable radial dimension or depth of a piston ring 18 inserted into the groove. A spring element 22 is arranged between the radially inner surface 19 of the piston ring 18 and the base 20 of the groove 16.

Figure 2:
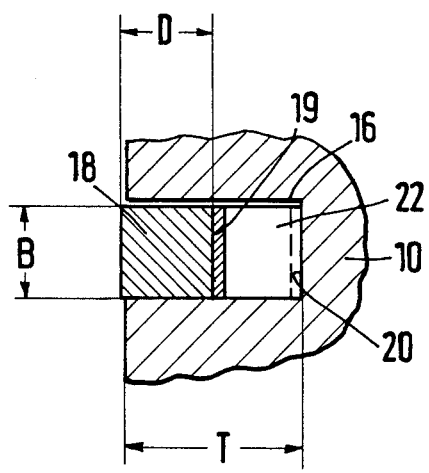
FIG. 2 is an enlarged detail view of a portion of FIG. 1 illustrating the piston ring and piston ring groove.
Figure 3:
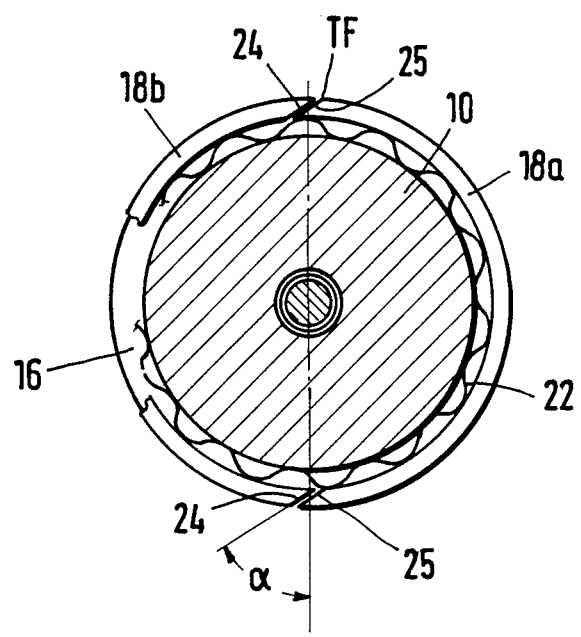
FIG. 3 is a cross-sectional view taken along the line III—III in FIG. 1.

As depicted in FIG. 3, the piston ring 18 also formed of ceramic material is made up of two identical half-rings 18a, 18b each with a rectangular cross-section, as can be seen in FIG. 2, with the end faces 24, 25 of the half rings facing one another being inclined at an angle $\alpha$ inclined with respect to the radius of the piston. The thickness B, that is, the dimension of the piston ring in the axial direction of the piston, is in the range of 0.02 to 0.04 times the diameter and the depth or radial dimension D is in the range of 0.02 to 0.04 times the diameter and the joint TF between the end faces 24, 25 of the half-rings 18a, 18b is approximately 0.01 times the diameter of the piston ring, while the angle $\alpha$ of the end faces is in the range between 40° to 80° relative to a line extending radially through the axis of the piston.

A spring 22 with an undulating or corrugated form serves as the spring element in the embodiment of FIGS. 1-3 and is made of spring steel of commercial construction. The corrugated spring 22 has a diameter so that it can be positioned between the piston ring 18 and the base 20 of the groove 16. The spring 22 tends to move the piston ring parts or halves 18a, 18b forming the piston ring 18 in the radially outward direction in FIG. 3 and such outward movement is prevented by the inner surface of the cylinder, not shown, when the piston is inserted into the cylinder.

Figure 4:
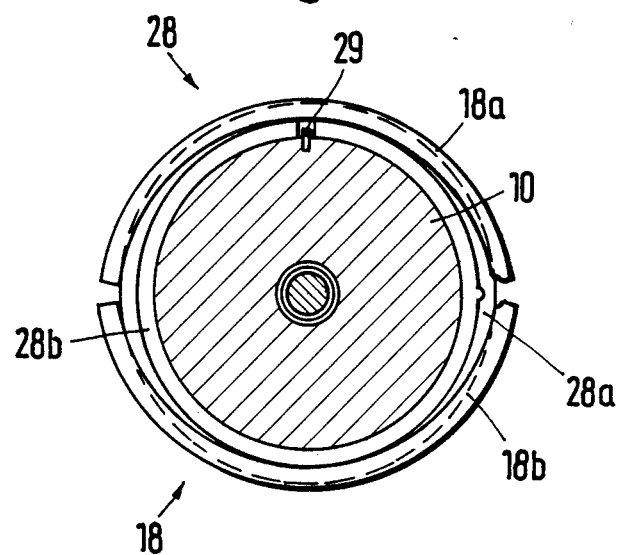
FIG. 4 is a cross-sectional view similar to FIG. 3 illustrating a second embodiment of the piston ring arrangement shown in FIG. 1.
Figure 5:
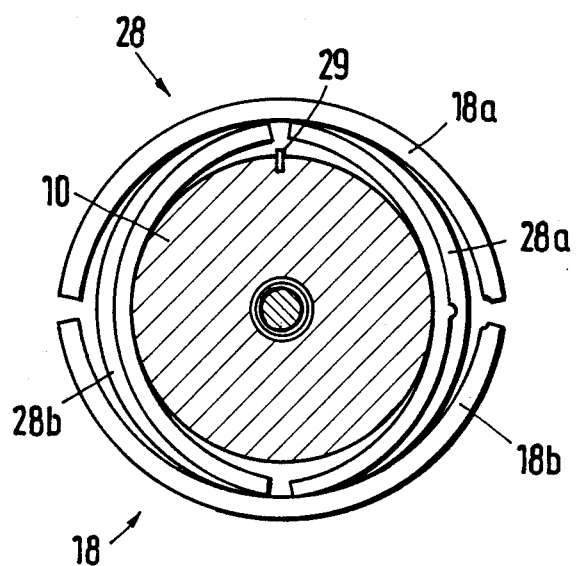
FIG. 5 is a view of the piston ring arrangement displayed in FIG. 4, however, in the relaxed condition.

Another embodiment of the piston ring arrangement is shown in FIGS. 4 and 5. In these figures the parts corresponding to the first embodiment are designated by the same reference characters.

In place of the corrugated spring 22, a ring 28 formed of ceramic material is divided into two halves and is positioned in the radially inner part of the groove 16 so that it presses the piston ring 18 divided into two parts with an appropriate preload against the surface of the cylinder, not shown. The radially outer piston ring parts or halves 18a, 18b must be fabricated to provide a preload of approximately 0.02 mm on the outside diameter of the ring half as compared to its nominal dimension. The radially inner ring halves 28a, 28b are provided with a preload of 0.04 mm on the outside diameter as compared to the nominal inside diameter of the radially inner piston ring so that, when inserted into the cylinder, they press the outer piston ring parts 18a, 18b radially outwardly.

Accordingly, the piston ring parts or halves are offset by 90° with respect to one another, that is, the end faces of the radially inner ring halves are spaced 90° from the end faces of the radially outer ring halves. The radially inner piston ring parts are secured with a commercially available pin 29 in the base of the groove to prevent twisting. The radially outer piston ring halves are secured by a pin, not shown, extending perpendicularly to the plane of the drawing or by a lug fabricated in one of the piston ring halves.

While specific embodiments of the invention have been shown and described in detail to illustrate the application of the inventive principles, it will be understood that the invention may be embodied otherwise without departing from such principles.

We claim:

1. A piston ring arrangement for use in a ceramic material cylinder in an internal combustion engine comprising an axially displaceable piston having a circumferential surface, a first piston ring mounted in the circumferential surface of said piston, said piston and said first piston ring being formed of a ceramic material, wherein the improvement comprises that said first piston ring comprises two circumferentially extending parts, said piston having a circumferentially extending groove in the circumferential surface thereof, said two parts of said first piston ring mounted within said groove, a second divided spring piston ring formed of a ceramic material and having a smaller diameter than the first piston ring, the second piston ring located within and adjacent to the first piston ring, the end faces of said first piston ring parts being angularly offset relative to the end faces of said second piston ring, said groove having a first dimension extending in the axial direction of said piston and a second dimension extending in the radial direction of said piston, said first and second piston ring each having a first dimension extending in the axial direction of said piston and a second dimension extending in the radial direction of said piston, the second dimension of said groove being greater than the corresponding second dimension of said first piston ring, so that an annular space is defined for accommodating the second piston ring between the first piston ring and the base of said groove, said second piston ring biasing said first piston ring in the radial direction.

2. A piston ring arrangement, as set forth in claim 1, wherein each said piston ring part of said first mentioned piston ring extends for half of said first mentioned piston ring, said second divided piston ring comprises a pair of second piston ring halves, each of said first mentioned piston ring parts and said second piston ring halves having end faces and said end faces disposed in closely spaced relation and the end faces of said first mentioned piston ring parts being offset angularly by 90° from said end faces of said second piston ring halves.

3. A piston ring arrangement, as set forth in claim 2, wherein said end faces of said first and second piston rings are inclined at an angle to a radially extending line passing through the axis of said piston.

4. A piston ring arrangement, as set forth in claim 1, wherein said first mentioned piston ring is fabricated with a preload of approximately 0.02 mm on the outer diameter thereof with respect to the nominal diameter and said second piston ring being divided into piston ring halves each with a preload of 0.04 mm on the outer diameter thereof relative to the nominal inside diameter of said first mentioned piston ring.

5. A piston ring arrangement, as set forth in claim 1, wherein the axial dimension of said first piston ring is in the range of 0.02 to 0.04 times the diameter thereof, the radial dimension of said first piston ring is in the range of 0.02 to 0.04 times the diameter of said first piston ring and the separation between the end faces of said first piston ring parts is approximately 0.01 times the diameter of said first piston ring.

* * * * *